US005529695A

United States Patent [19]

Gwozdz

[11] Patent Number: 5,529,695
[45] Date of Patent: Jun. 25, 1996

[54] APPARATUS AND METHOD FOR REMOVING SWARF AND FINES FROM CUTTING FLUIDS

[75] Inventor: Paul J. Gwozdz, Poestenkill, N.Y.

[73] Assignee: The United States of America as represented by the Secretary of the Army, Washington, D.C.

[21] Appl. No.: 281,798

[22] Filed: Jul. 21, 1994

[51] Int. Cl.$^6$ .......................... B01D 21/02; B01D 35/06

[52] U.S. Cl. .......................... 210/695; 210/112; 210/223; 210/307; 210/312; 210/320; 210/416.1; 210/740; 210/801; 210/803; 210/804

[58] Field of Search .......................... 210/112, 113, 210/114, 222, 223, 320, 534–536, 695, 740, 744, 801, 803, 804, 307, 312, 416.1; 209/39, 156, 208, 210, 219, 232

[56] References Cited

U.S. PATENT DOCUMENTS

| | | | |
|---|---|---|---|
| 1,521,704 | 1/1925 | Munro | 210/113 |
| 2,466,839 | 4/1949 | Caldwell | 210/222 |
| 3,257,081 | 7/1966 | Brown et al. | 210/223 |
| 3,551,330 | 12/1970 | Jernqvist et al. | 210/112 |
| 3,744,634 | 7/1973 | Schlenz | 210/534 |
| 4,876,015 | 10/1989 | McKibben | 210/223 |
| 5,362,403 | 11/1994 | Dosoudil | 210/112 |

*Primary Examiner*—Matthew O. Savage
*Attorney, Agent, or Firm*—Saul Elbaum; Edward Goldberg; Michael Sachs

[57] ABSTRACT

A system for removing particulates, formed as metal is machined, from cooling and lubricating fluid. The system has a tank filled with fluid. The bottom of the tank slopes forward. The tank receives contaminated fluid at its top rear. The contaminants are swarf (chips removed from the workpiece) and fines (which come both from the workpiece and the grinder, borer, or drill). After the swarf is removed from the contaminated fluid by a magnetic filter, only fines remain. The fluid contaminated with fines flows from back to front in the tank, passing under a baffle projecting vertically downward from the top of the tank. A whoosh plate causes the fines to settle out into the tank, while uncontaminated fluid flows over the whoosh plate and is reused. The fines collect at the tank's bottom, from where they are pumped out and mixed with the magnetically-removed swarf for removal.

4 Claims, 2 Drawing Sheets

10 12 36 38 24 14 23 18 30 26 32 28 22 34 20 16

APPARATUS AND METHOD FOR REMOVING SWARF AND FINES FROM CUTTING FLUIDS

The invention described herein may be manufactured, used, and licensed by or for the Government for Governmental purposes without the payment to me of any royalties thereon.

BACKGROUND OF THE INVENTION

This invention relates to the removal, from the cooling and lubricating fluid used for precision machining of metal objects, of the particles entrained in the fluid during machining. Such machining includes the boring of accurate holes in large metal objects (as, for example, the boring of cannon) and the formation of metal objects by grinding.

These entrained particles are of two kinds: (1) "swarf", that is, chips, shavings, and other fine particles removed from the work piece by the grinding or boring tools, and (2) "fines", whose definition is either (a) "particles smaller than average in a mixture of particles varying in size" or "fine material which passes through a standard screen on which coarser fragments are retained".

In the early 1940s Watervliet Arsenal installed a huge settling tank, measuring 10 ft.×10 ft.×10 ft., that held about twenty drums of oil. This tank supplied clean, cool oil for cannon honing. The tank required cleaning once a year to remove entrained particles. It had be pulled out of the ground to be hand cleaned with shovels, because swarf mixed with fines becomes a hard, caked material when both are allowed to settle together in a settling tank. The cleaning was very costly, requiring between forty and eighty hours of manual labor, during which time no boring or grinding could be carried out.

Cooling systems of smaller size replaced this large tank in the newer machinery installed in American arsenals. The smaller cooling systems relied on filters to remove swarf and fines. These filters require regular cleaning at weekly intervals, which also results in large amount of downtime. Four to twelve man-hours of cleaning labor per week is necessary. Also, these filters do not remove all the fines. These fines get deposited all over the machine and operating area, which leads to substantial equipment damage because of wear.

The best system presently available for removing entrained particles incorporates a magnetic filter. A series of magnets catches most of the metal swarf. The swarf forms a porous filter medium that screens out most of the stone particles, those that are twenty microns and larger. The rest of the particles, especially the fines, remain in the fluid. They are agitated so that they do not settle, and they are then removed by a costly system that uses a pleated cartridge filter.

OBJECTS AND SUMMARY OF THE INVENTION

An object of the present invention is to provide a system that removes entrained particles from the cooling and lubricating fluid used in machining metal that overcomes the drawbacks of the prior art by pumping out fines that have settled rather than removing them by filtration.

A further object of the present invention is to provide such a system that does not require agitation of the fluid.

Still a further object of the present invention is to provide such a system that can make clean coolant available at all times.

Yet another object of the present invention is to provide such a system that reduces the time needed to clean coolant tanks, filters, pipes, and bed ways.

Still a further object of the present invention is to provide such a system that keeps a working area clean, thereby requiring fewer man hours to clean and repair equipment.

Still a further object of the present invention is to provide such a system that minimizes the waste disposed of into the environment, including waste water and industrial by-products.

Briefly stated, the present invention provides a system for removing particulates, formed as metal is machined, from cooling and lubricating fluid. The system has a tank filled with fluid. The bottom of the tank slopes forward. The tank receives contaminated fluid at its top rear. The contaminants are swarf (chips removed from the workpiece) and fines (which come both from the workpiece and the grinder, borer, or drill). After the swarf is removed from the contaminated fluid by a magnetic filter, only fines remain. The fluid contaminated with fines flows from back to front in the tank, passing under a baffle projecting vertically downward from the top of the tank. A whoosh plate causes the fines to settle out into the tank, while uncontaminated fluid flows over the whoosh plate and is reused. The fines collect at the tank's bottom, from where they are pumped out and mixed with the magnetically-removed swarf for removal.

According to an embodiment of the invention, a system for removing contaminants from a fluid used in machining comprises: a settling tank; the tank having an open top and a sloping bottom; means for introducing the fluid contaminated with particulates into the tank; means for magnetically removing a first portion of the particulates from the fluid; means for causing a second portion of the particulates to settle to the bottom; and means for hydraulically removing the second portion from the tank.

According to a feature of the invention, a method for removing particulate contaminants from a fluid used in machining, the contaminants including swarf and fines, comprises: passing the fluid through a magnetic filter to remove the swarf; directing the fluid after removal of the swarf into a settling tank; sensing a predetermined density of fines in a lower portion of the settling tank; and removing the fines from the settling tank in response to the step of sensing.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
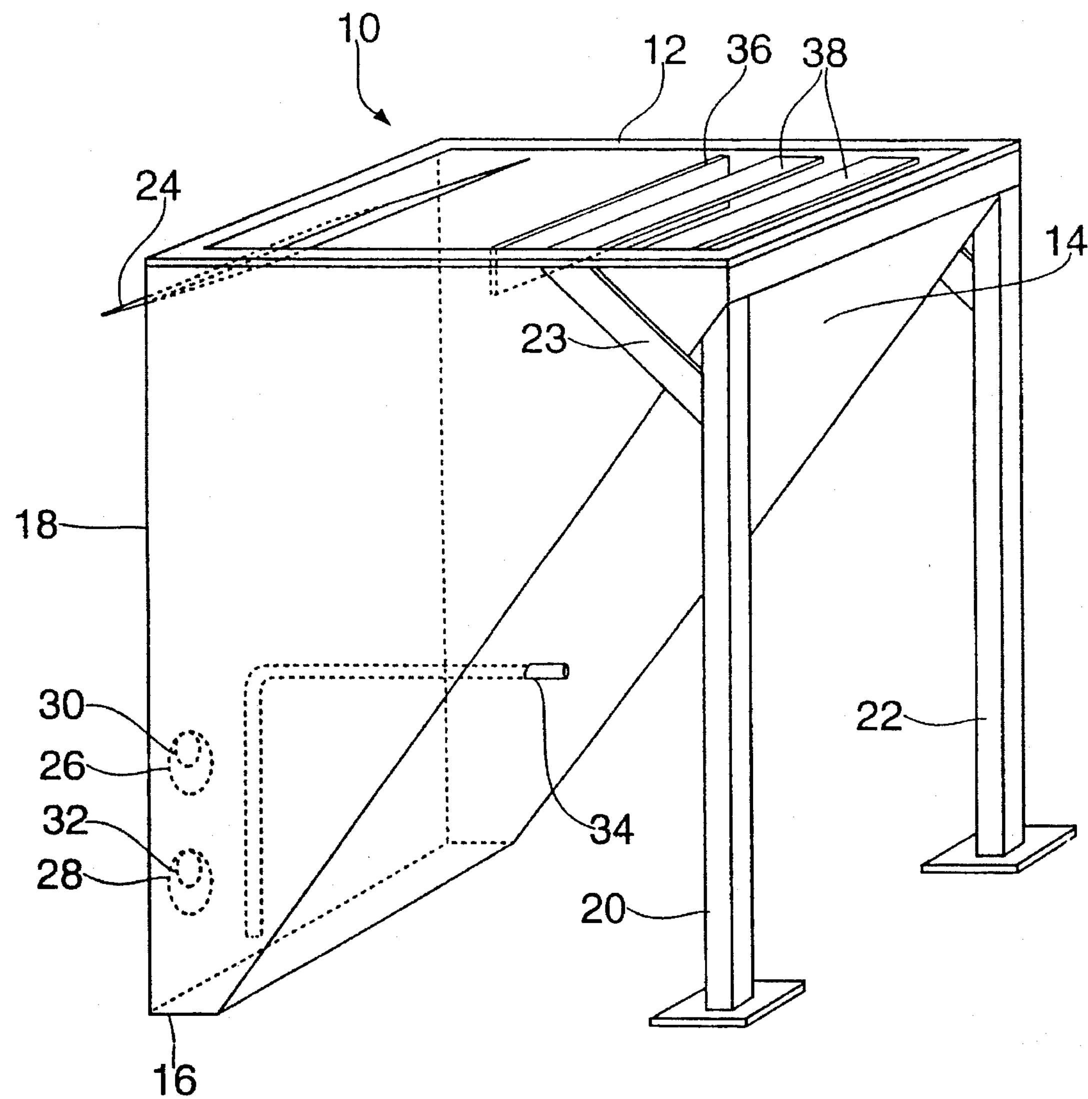
FIG. 1 is a perspective view of a sloped settling tank according to the present invention.

Referring to FIG. 1, a tank 10 has an open top 12, of rectangular or other convenient shape, and is closed elsewhere. The back 14 of tank 10 slopes from a rear edge of top 12 to a bottom 16 of a front 18. The rear of tank 10 is supported by a pair of legs 20, 22, each of which is fixed to top 12 at respective top ends of back 14 and has a brace 23 that helps support top 12. A whoosh plate 24, inclined 120 degrees from the vertical, forces even flow of a fluid (not shown) that enters tank 10 through open top 12 and flows in the direction from back 14 to front 18. The effect of whoosh plate 24 is to cause the same settling effect on particulates in the fluid in the same manner as a delta at the mouth of a river causes settlement of sediment in the river water.

An upper opening 26 and a lower opening 28 are vertically aligned in front 18 towards bottom 16. Upper opening 26 holds a sensor 30 for high-level fines. Lower opening 28 holds a sensor 32 for low-level fines. A pipe 34, within tank 10, has a right-angle. Pipe 34 has a downward-facing open end directed towards bottom 16 and close thereto. The other end of pipe 34 is parallel to open top 12 and leads out of tank 10. A vertical baffle 36 is mounted at the top of tank 10 forward of back 14 and about one-third of the distance to front 18. A pair of horizontal supports 38 are mounted at the top rear of tank 10.

Figure 2:
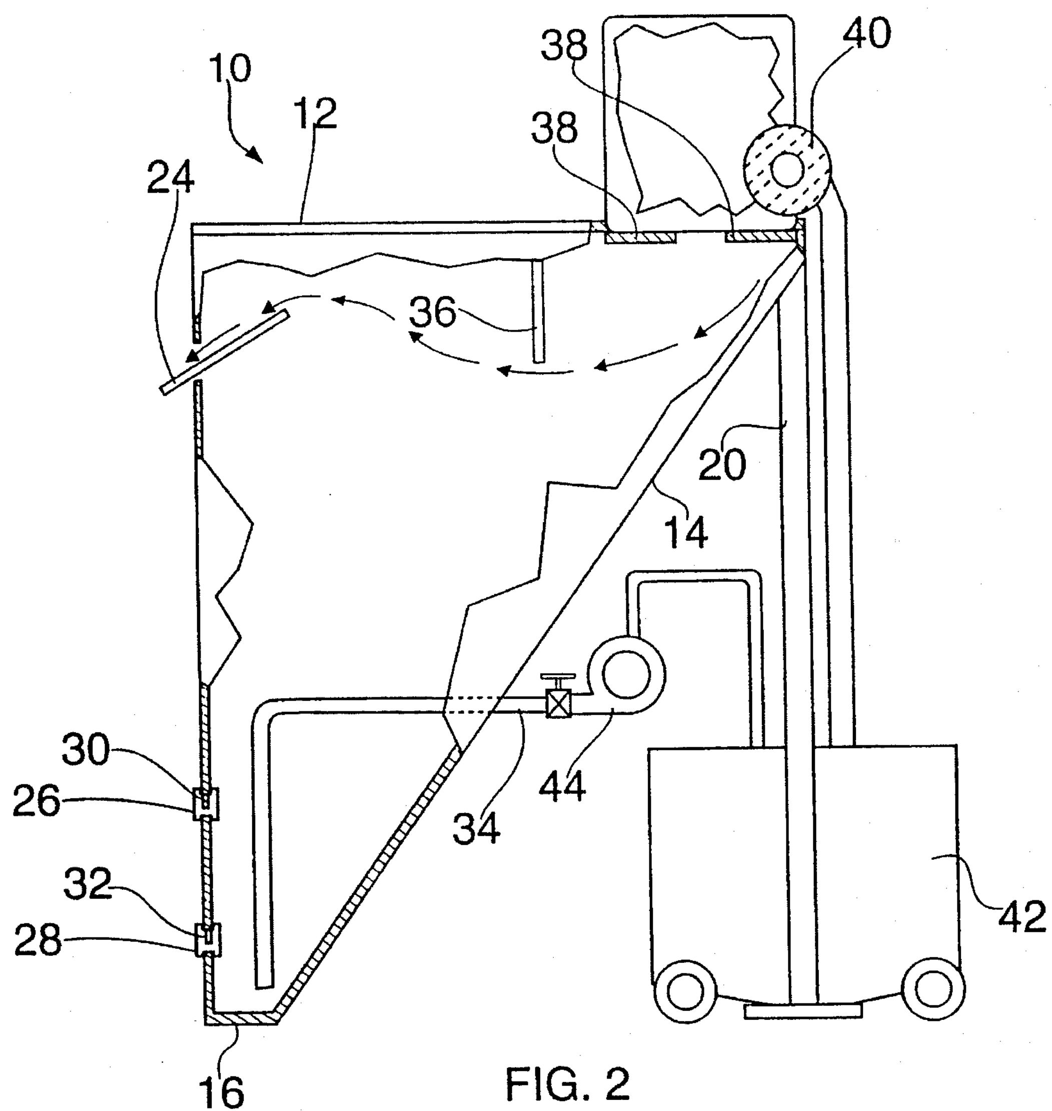
FIG. 2 is a side view of the tank of FIG. 1, including the additional components of the system of the present invention.

Referring to FIG. 2, tank 10 is kept filled with fluid up to whoosh plate 24. Supports 38 hold a vessel (not shown) that supplies, at the top rear of tank 10, additional fluid that is contaminated with particulates. The contaminated fluid passes over a magnetic filter 40 that removes swarf magnetically. The magnetically-removed swarf falls directly down into a cart 42 positioned between legs 20, 22. Cart 42 moves on wheels for easy disposal of its contents.

After passing over magnetic filter 40, the contaminated fluid, now containing only fines, flows toward front 18, passing beneath baffle 36. It flows over whoosh plate 24, whose effect is to cause clean fluid to flow over it and to direct the contaminating fines downward to settle within tank 10. A solids pump 44 sucks the fines into pipe 34 and pumps them out of tank 10 into cart 42, from which they are removed along with the swarf removed by magnetic filter 40. Solids pump 44 is turned on by sensor 30 when the density of fines reaches a predetermined level. Solids pump 44 is turned off when sensor 32 detects that fines have fallen to another predetermined level.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A system for removing contaminants including swarf and fines from a fluid used in machining, comprising:

a settling tank;

said settling tank having a top portion;

said top portion having first and second opposed edges;

said top portion having an inlet adjacent said first opposed edge;

said settling tank having a bottom parallel to said top portion;

a first wall joining said first opposed edge of said top portion to said bottom;

said first wall defining a plane forming an acute angle with a plane defined by said top portion;

a second wall joining said second opposed edge said top portion to said bottom;

said second wall defining a plane orthogonal to said plane defined by said top portion;

means for introducing said fluid contaminated with swarf and fines into said inlet of said top portion;

magnetic filter means on said top portion at said inlet for magnetically removing said swarf from said fluid;

a baffle plate mounted adjacent said first wall, wherein said baffle plate extends perpendicularly from said top portion towards said bottom and is parallel to said first and second opposed edges;

an outlet through an upper portion of said second wall, whereby said fluid exits said settling tank after said first and second portions of said particulates are removed;

a whoosh plate mounted in said second wall at said outlet, wherein said whoosh plate extends at an angle of 120 degrees from a portion of said second wall located between said outlet and said bottom;

whereby said baffle plate and said whoosh plate causes said fines to settle to the bottom of said tank; and means for automatically preventing an accumulation of said second portion inside said tank.

2. A system as in claim 1, wherein said means for automatically preventing includes a pump located outside of said settling tank;

a right-angled pipe connecting said pump to said settling tank;

said right-angled pipe having an intake in a lower region inside said settling tank;

said intake facing said bottom of said settling tank;

means for automatically operating said pump, whereby said pump prevents accumulation of said second portion inside said tank by pumping said second portion to an exterior of said tank for disposal.

3. System as in claim 2, wherein said means for automatically operating includes:

a first sensor located inside said settling tank in a first region near said bottom;

a second sensor located inside said settling tank in a second region between said first sensor and said bottom;

said first sensor starting said pump when said second portion of contaminants exceeds a predetermined density in said first region; and said second sensor stopping said pump when said second portion of contaminants falls below a predetermined density in said second region.

4. A method for removing particulate contaminants from a fluid, said contaminants including swarf and fines, said method comprising:

providing a system according to claim 3;

passing said fluid through magnetic filter means for magnetically removing to remove said swarf;

directing said fluid after removal of said swarf into said settling tank;

causing said fluid to flow from said inlet past said baffle plate and whoosh plate such that said fines settle to the bottom of said tank;

removing clarified fluid from said outlet;

sensing a first predetermined density of fines at a first level in said settling tank via said first sensor;

removing the settled fines from said settling tank in response to said step of sensing a first predetermined density;

sensing a second predetermined density of fines at a second, lower level in said settling tank via said second sensor means; and stopping said removing when said second density of fines reaches a second predetermined density.

* * * * *